US009055339B2

(12) United States Patent
Choi

(10) Patent No.: US 9,055,339 B2
(45) Date of Patent: Jun. 9, 2015

(54) SYSTEM, APPARATUS, AND METHOD FOR CONDITIONAL BROADCAST RECEPTION WITHOUT CABLECARD

(75) Inventor: Myung-Sik Choi, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 507 days.

(21) Appl. No.: 12/605,051

(22) Filed: Oct. 23, 2009

(65) Prior Publication Data

US 2010/0115547 A1    May 6, 2010

(30) Foreign Application Priority Data

Oct. 23, 2008   (KR) .................. 10-2008-0103975

(51) Int. Cl.
*H04N 7/167* (2011.01)
*H04N 21/4623* (2011.01)
*H04N 7/16* (2011.01)
*H04N 21/4367* (2011.01)
*H04N 21/4405* (2011.01)

(52) U.S. Cl.
CPC ........... *H04N 21/4623* (2013.01); *H04N 7/163* (2013.01); *H04N 21/4367* (2013.01); *H04N 21/4405* (2013.01)

(58) Field of Classification Search
USPC ........ 725/31; 380/239, 281; 713/190; 726/21
See application file for complete search history.

(56) References Cited

U.S. PATENT DOCUMENTS

| 7,697,686 | B2* | 4/2010 | Puiatti et al. ................. 380/239 |
| 2003/0061477 | A1 | 3/2003 | Kahn et al. |
| 2003/0182579 | A1* | 9/2003 | Leporini et al. .............. 713/201 |
| 2005/0238170 | A1* | 10/2005 | Ksontini et al. .............. 380/268 |
| 2007/0098352 | A1* | 5/2007 | Cha et al. ........................ 386/46 |
| 2007/0261076 | A1 | 11/2007 | Puputti |
| 2008/0086780 | A1* | 4/2008 | Chen et al. ..................... 726/27 |
| 2008/0266464 | A1* | 10/2008 | Chen ............................ 348/728 |
| 2009/0199231 | A1* | 8/2009 | Tsuria et al. .................. 725/32 |
| 2010/0115547 | A1* | 5/2010 | Choi ............................. 725/31 |

OTHER PUBLICATIONS

CAS-DRM Cooperation Technology, TTA Journal No. 117, May 2008.
Korean Office Action dated Mar. 23, 2015 issued in counterpart application No. 10-2008-0103975.

* cited by examiner

Primary Examiner — Nnenna Ekpo
(74) Attorney, Agent, or Firm — The Farrell Law Firm, P.C.

(57) ABSTRACT

A broadcast reception system, apparatus, and method for a Conditional Access System (CAS) function without a cablecard are provided. A security processor for performing a CAS function without using a cablecard includes a security processor for receiving Entitlement Control Message (ECM) information and Entitlement Management Message (EMM) information from a set-top box, extracting a Control Word (CW) using the ECM information and the EMM information, encrypting the CW, and transmitting the encrypted CW to the set-top box.

26 Claims, 5 Drawing Sheets

SYSTEM, APPARATUS, AND METHOD FOR CONDITIONAL BROADCAST RECEPTION WITHOUT CABLECARD

PRIORITY

This application claims priority under 35 U.S.C. §119(a) to a Korean patent application filed in the Korean Intellectual Property Office on Oct. 23, 2008 and assigned Serial No. 10-2008-0103975, the content of which is incorporated herein by reference.

BACKGROUND OF THE INVENTION

1. Field of the Invention

The present invention relates generally to a removable conditional reception module for supporting a Conditional Access System (CAS) for a pay broadcast channel in an OpenCable scheme. More particularly, the present invention relates to broadcast reception system, apparatus, and method for carrying out a CAS function without a cablecard, which includes a removable conditional reception module.

2. Description of the Related Art

Past analog pay broadcasting systems employ a conditional reception technique that merely generates distortion in a transmitted signal and allows a receiver to remove the generated distortion in order recover the signal. As broadcasts become digitized, new conditional reception techniques for encrypting the transmit data based on subscriber authentication and decrypting the data at a receiver have been introduced. The Conditional Access System (CAS) gives or restricts the right to view broadcast programs in a paid broadcast. In the CAS, the conditional reception function is carried out by a cablecard.

FIG. 1 illustrates a simplified diagram of the conventional CAS based on the cablecard.

Referring to FIG. 1, a headend 100, which is a broadcasting system for transmitting the broadcast, transmits audio, video, and data over a single channel using a Multiplexer (MUX) 102. The transmitted broadcast signal is scrambled by a Control Word (CW) and an Entitlement Control Message (ECM) to restrict the authorization to view the broadcast program. The headend 100 separately transmits Out Of Band (OOB) data. The OOB data 106 includes an Entitlement Management Message (EMM), Service Information (SI), etc. The SI is fed to a navigator 122 of a set-top box 110 and the EMM is fed to a security processor 140.

The set-top box 110, which receives the digital broadcast signal includes a tuner 112, a modulator 114, a DEMUltipleXer (DEMUX) 116, a decoder 118, a cable modem 120, the navigator 122, and a second descrambler 124. The tuner 112 receives the broadcast signal from the headend 100, tunes to an intended broadcast signal, and outputs the tuned broadcast signal to the modulator 114. The modulator 114 demodulates the tuned broadcast signal to a digital bit stream. The bit stream includes video, audio, and data stream, and also includes the ECM information. The video, audio, and data streams are output to a cablecard 130. The ECM 150 is fed to a security processor 140. The second descrambler 124 receives an encrypted Copy Protection (CP) key and the scrambled broadcast signal from the cablecard 130, decrypts the CP key, and descrambles the scrambled broadcast signal (including audio, video, and data signals) using the decrypted CP key. The DEMUX 116 splits the audio, video, and data signals from the descrambled broadcast signal and provides the separated signals to the decoder 118. The decoder 118 decodes the video, audio and data streams into a format that can be processed by a TV set. The cable modem 120 converts an analog signal to a digital signal to enable the use of high-speed Internet over a cable network. The cable modem 120 is used for two-way broadcasting according to the Data Over Cable Service Interface Specification (DOCSIS) Set-top Gateway (DSG) scheme. The navigator 122 provides program information to a user based on the SI fed from the headend 100.

The cablecard 130 is installed into the set-to box 110 according to a defined interface standard. A first descrambler 132 of the cablecard 130 descrambles and restores the scrambled broadcast signal output from the set-top box 110 using the CW provided from the security processor 140 and outputs the restored broadcast signal 160 to the scrambler 134. The scrambler 134 re-scrambles the descrambled broadcast signal under the control of the security processor 140 and outputs the scrambled broadcast signal to the second descrambler 124 of the set-top box 110. That is, the scrambler 134 scrambles the broadcast signal using the CP key according to a Copy Protection Protocol 190 and outputs the scrambled broadcast signal to the second descrambler 124 of the set-top box 110 together with the CP key.

The security processor 140 restores the ECM from the EMM and extracts the CW from the restored ECM. The extracted CW is provided to the first descrambler 132.

When the cablecard 130 is installed into the set-top box 110 and executes the CAS function, the pay broadcast service is provided. Users can enjoy the services from the multiple providers by installing various cablecards 130, which are provided by various broadcast service providers, respectively, into the set-top box 110.

As stated above, the CAS of the cablecard 130 descrambles the scrambled contents transmitted from the headend 100 with the CW provided from the security processor 140, scrambles the descrambled broadcast signal according to the copy protection protocol, and transmits the scrambled broadcast signal to the set-top box 110. The set-top box 110 restores the contents by descrambling the broadcast signal using the CP key and allows viewing of the paid broadcast by decoding the restored contents at the decoder 118. To generate the CP key, the cablecard 130 and the set-top box 110 verify whether the cablecard 130 and/or the set-top box 110 are authorized through the mutual authentication using X.509 certificates issued by OpenCable Trust Authority (TA). More specifically, the cablecard 130 and the set-top box 110 perform the mutual authentication using a Public Key Infrastructure (PKI) structure, and the set-top box 110 can output the paid broadcast provided from a plurality of headends without belonging to a particular CAS.

However a disadvantage of the conventional cablecard system is that, the cost of cablecards can be burdensome for consumers. Further, the heat generated from the cablecard may bend or deform the cablecard, or increase the temperature within the set-top box. Even further, the physical interface of the conventional cablecard increases the complexity of hardware and circuitry in the set-top box. Even further, in the conventional cablecard system, a channel change speed is lowered, due to the constraints of the signaling speed with the cablecard and the dual protection structure (scramble+CP) of Moving Picture Experts Group (MPEG)-2 Transport Stream (TS) transmission.

SUMMARY OF THE INVENTION

The present invention has been made to address at least the above-described problems and/or disadvantages and to provide at least the advantages described below. Accordingly, an aspect of the present invention provides a broadcast reception system, apparatus, and method for performing a Conditional Access System (CAS) function without using a cablecard.

Another aspect of the present invention provides a broadcast reception system, apparatus, and method for reducing heat generation of a cablecard and complexity of hardware and circuitry in a set-top box.

According to an aspect of the present invention, an apparatus of a set-top box for performing a CAS function without a cablecard includes a tuner for tuning to a scrambled broadcast signal from a headend; a demodulator for demodulating the tuned broadcast signal; and a descrambler for descrambling the demodulated broadcast signal using an encrypted Control Word (CW).

According to another aspect of the present invention, an apparatus of a security processor for performing a CAS function without a cablecard, includes the security processor for receiving Entitlement Control Message (ECM) information and Entitlement Management Message (EMM) information from a set-top box, extracting a CW using the ECM information and the EMM information, encrypting the CW, and transmitting the encrypted CW to the set-top box.

According to yet another aspect of the present invention, an operation method of a set-top box for performing a CAS function without a cablecard includes tuning to a scrambled broadcast signal from a headend; demodulating the tuned broadcast signal; and descrambling the demodulated broadcast signal using an encrypted CW.

According to still another aspect of the present invention, an operation method of a security processor for performing a CAS function without a cablecard includes receiving ECM information and EMM information from a set-top box; and extracting a CW using the ECM information and the EMM information, encrypting the CW, and transmitting the encrypted CW to the set-top box.

BRIEF DESCRIPTION OF THE DRAWINGS

The above and other aspects, features and advantages of certain embodiments the present invention will become more apparent from the following detailed description taken in conjunction with the accompanying drawings, in which.

Throughout the drawings, like reference numerals will be understood to refer to like parts, components and structures.

DETAILED DESCRIPTION OF EMBODIMENTS OF THE PRESENT INVENTION

Embodiments of the present invention are described in detail with reference to the accompanying drawings. Detailed descriptions of well-known constructions or processes may be omitted to avoid obscuring the subject matter of the present invention. Terms described below, which are defined considering functions in the present invention, should be defined on the basis of the disclosure throughout this specification.

Embodiments of the present invention include a broadcast reception system, apparatus, and method for performing a Conditional Access System (CAS) function without using a cablecard.

Figure 1:
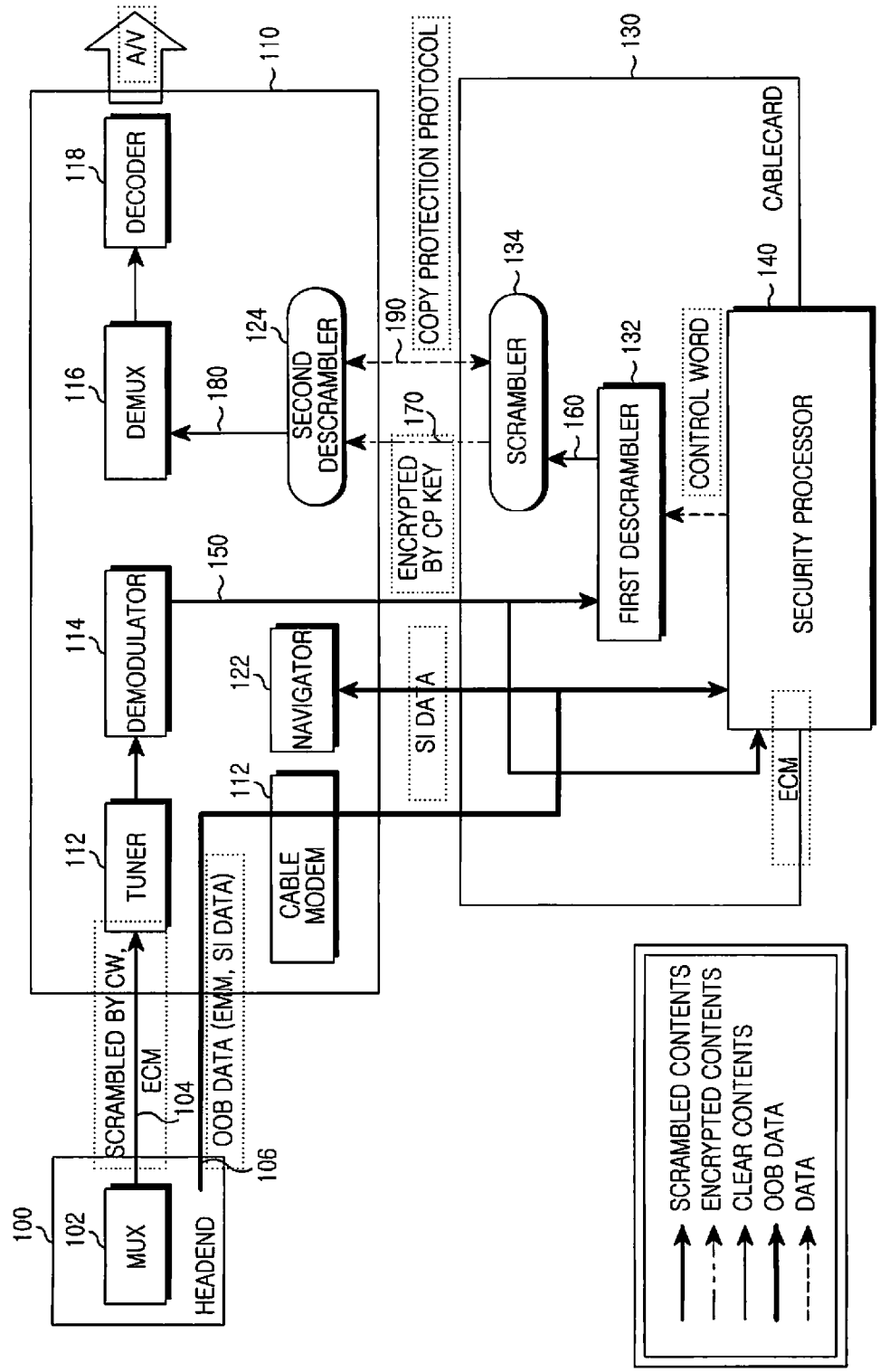
FIG. 1 illustrates a conventional Conditional Access System (CAS) based on a cablecard.
Figure 2:
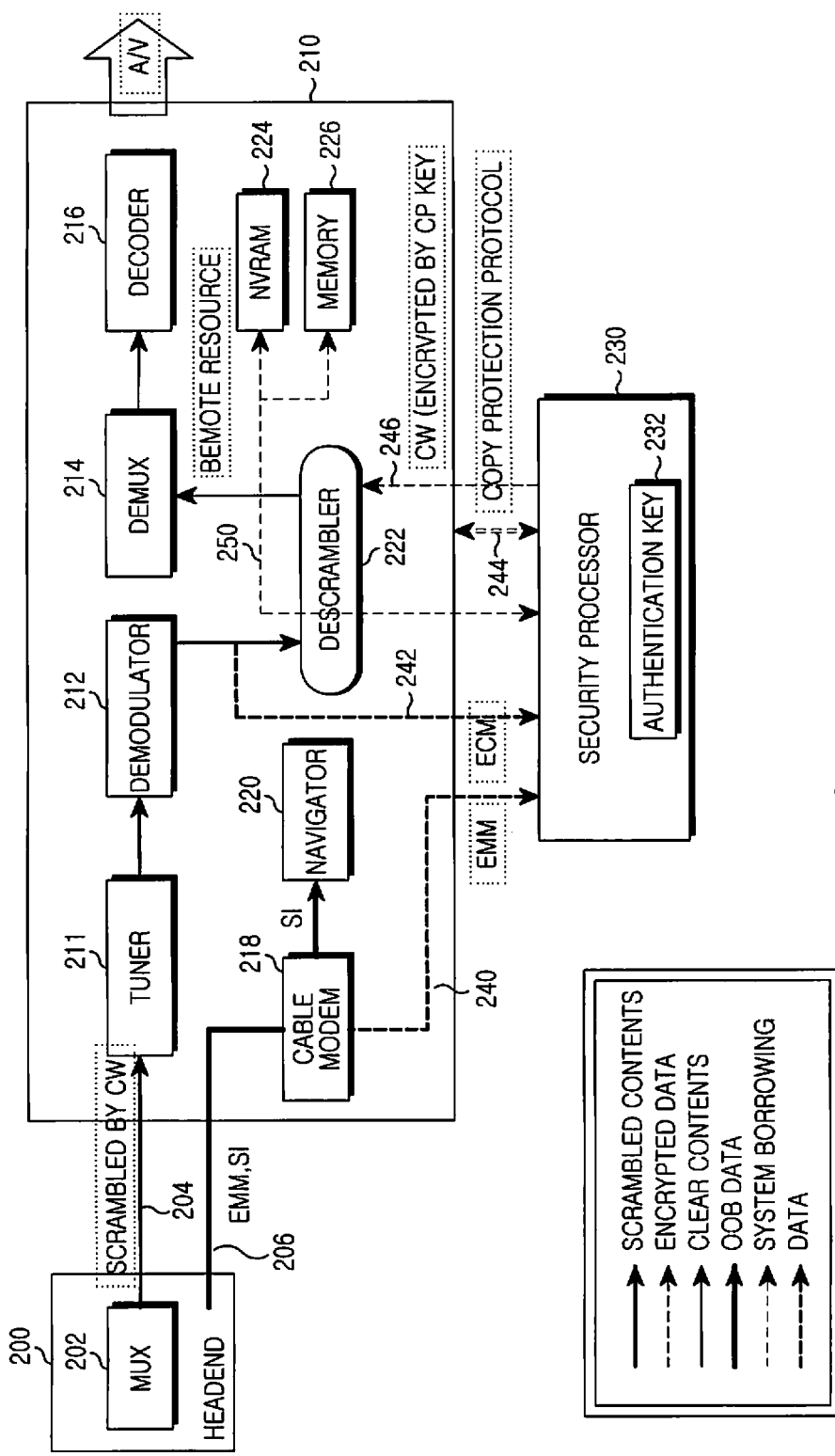
FIG. 2 illustrates a system for performing a CAS function without using a cablecard according to an embodiment of the present invention.

FIG. 2 illustrates a system for performing the CAS function without using a cablecard according to an embodiment of the present invention.

Referring to FIG. 2, a headend 200, which is a broadcasting system for transmitting the broadcast, transmits audio, video, and data 204 over a single channel using a MUltipleXer (MUX) 202. The transmitted broadcast signal is scrambled by a Control Word (CW) and an Entitlement Control Message (ECM) to restrict the authority to view the broadcast program. The headend 200 separately transmits Out Of Band (OOB) data 206. The OOB data 206 includes an Entitlement Management Message (EMM), Service Information (SI), etc.

A set-top box 210, which receives digital broadcast signals, includes a tuner 211, a modulator 212, a DEMUltipleXer (DEMUX) 214, a decoder 216, a cable modem 218, a navigator 220, a descrambler 222, a Non-Volatile Random Access Memory (NVRAM) 224, and a memory 226.

The tuner 211 receives the scrambled broadcast signal 204 from the headend 200, tunes to the intended broadcast signal, and outputs the tuned broadcast signal to the modulator 212. The modulator 212 demodulates the tuned broadcast signal to a digital bit stream. The bit stream includes video, audio, or data stream, and also includes ECM information. The video, audio, or data streams are output to the descrambler 222. The ECM information 242 is fed to the security processor 230. In so doing, when the set-top box 210 transmits a Conditional Access Program Map Table (CAPMT) to the security processor 230 when the tuner 112 tunes to a different channel, the security processor 230 sends a request for ECM filtering to the set-top box 210 and the set-top box 210, upon receiving the request, provides the security processor 230 with the ECM filtered by referring to the ECM filtering information. The descrambler 222 receives the encrypted CW from the security processor 230, decrypts the encrypted CW using the corresponding CP key, and descrambles the video, audio, or data stream output from the modulator 212 using the decrypted CW. The encrypted CW from the security processor 230 has the same information as the CW used to scramble the broadcast signal at the headend 200. The DEMUX 214 splits the descrambled audio, video, and data signals and provides them to the decoder 216. The decoder 216 decodes the video, audio, and data streams into a format that can be interpreted by a TV set. For example, a video decoder decodes information of consecutive screens compressed and stored to video packets and outputs the decoded information in an adequate size for any one of a variety TV screens, which may have different resolutions. An audio decoder (not shown) decodes and outputs the compressed audio bit stream to a speaker. A data decoder (not shown) processes information relating to channels and programs. After the data decoder decodes the data, the data is transferred to a processor, which controls the set-top box 210, or to a peripheral device connected to the set-top box 210.

The cable modem 218 converts an analog signal to a digital signal to enable use of high-speed Internet over a cable network. The cable modem 218 is used for two-way broadcasting according to the DOCSIS Set-top Gateway (DSG) scheme. In addition, the cable modem 218 receives the OOB data (SI and EMM) from the headend 200, forwards the SI to the navigator 220 and forwards the EMM to the security processor 230. The EMM information is delivered to the security processor 230 according to the EMM filtering requested by the security processor 230. The navigator 220 provides program information to the user based on the SI from the headend 200.

The security processor 230 restores the ECM fed from the demodulator 212 using the EMM provided from the cable modem 218, and extracts the CW from the restored ECM. The extracted CW is encrypted and provided to the descrambler 222 of the set-top box 210. The CW required for the descrambling is encrypted with a Copy Protection (CP) key and is transferred to the set-top box 210.

The CW periodically changes according to a time set by a CAS server. Accordingly, when CW change is triggered, the security processor 230 acquires corresponding ECM information and sends the changed CW to the set-top box 210. The set-top box 210, upon receiving the changed CW, performs descrambling using a changed CW. Herein, the CW transmitted can be verified using the CW encryption and a Message Authentication Code (MAC) using a hash function (for example, Secure Hash Algorithm-1 (SHA-1)) so as to guarantee its integrity and secrecy.

The memory 226 provides a memory space required for the video decoding and the descrambling. Also, the memory 226 temporarily stores data generated during operations of the set-top box 210. The NVRAM 224 stores control information and booting information of the set-top box 210.

As described above, according to the present invention, CAS functions can be conducted with the security processor 230, without use of a cablecard. Yet, some of the functions of the cablecard are committed to the set-top box 210 at maximum by considering the restrictions of the security processor 230, and the security processor 230 is constructed to borrow necessary resources (such as the memory 226, a buffer for EMM-ECM, and the NVRAM 224) from the set-top box 210. Herein, in order to prevent external attacks or hacking, the set-top box 210 is authenticated using an OpenCable Certificate Chain based on a Public Key Infrastructure (PKI), and the descrambling for a Transport Stream (TS), which is conventionally conducted by a cablecard, is conducted within the set-top box 210.

Figure 3:
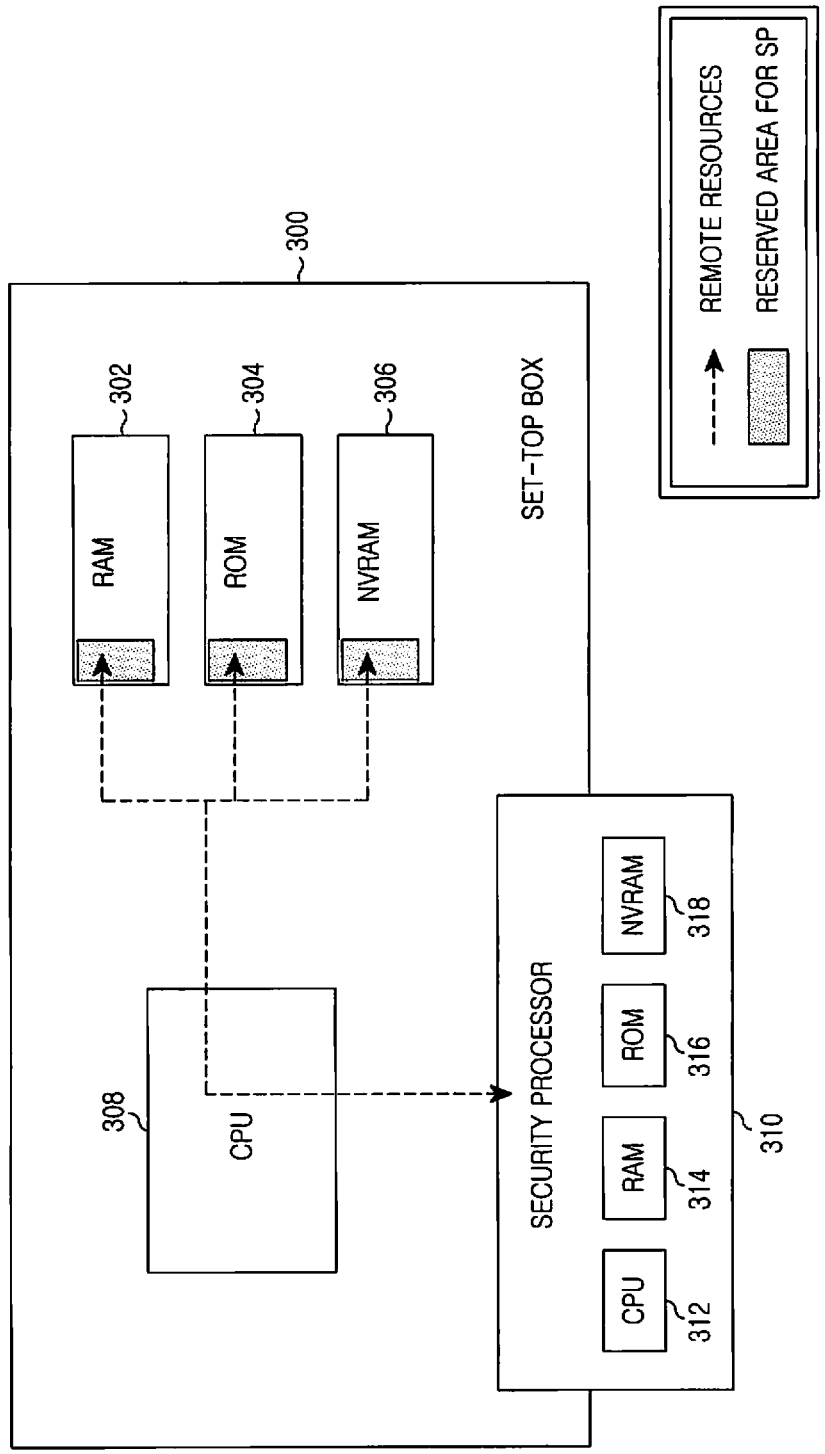
FIG. 3 illustrates resources provided from a set-top box to a security processor according to an embodiment of the present invention.

FIG. 3 is a simplified diagram of resources provided from the set-top box 210 to the security processor 230 through an ISO7816 or USB InterFace (I/F) according to an embodiment of the present invention.

In FIG. 3, the security processor 310 includes a Central Processing Unit (CPU) 312, a Random Access Memory (RAM) 314, a Read Only Memory (ROM) 316, and a NVRAM 318. The security processor 310 processes the authentication and security functions and performs some of the cablecard functions, such as extracting the CW. When the CPU 312, the RAM 316, the ROM 316, and the NVRAM 318 have a sufficient memory capacity, some cablecard functions may be performed without borrowing the resources from the RAM 302, the ROM 304, and the NVRAM 306 of the set-top box 300. When the security processor 310 is not able to process some cablecard functions, due to the small memory capacity of the CPU 312, the RAM 314, the ROM 316, and the NVRAM 318, the security processor 310 performs some cablecard functions by borrowing the reserved resources of the set-top box 300 from the RAM 302, the ROM 304, and the NVRAM 306.

Figure 4:
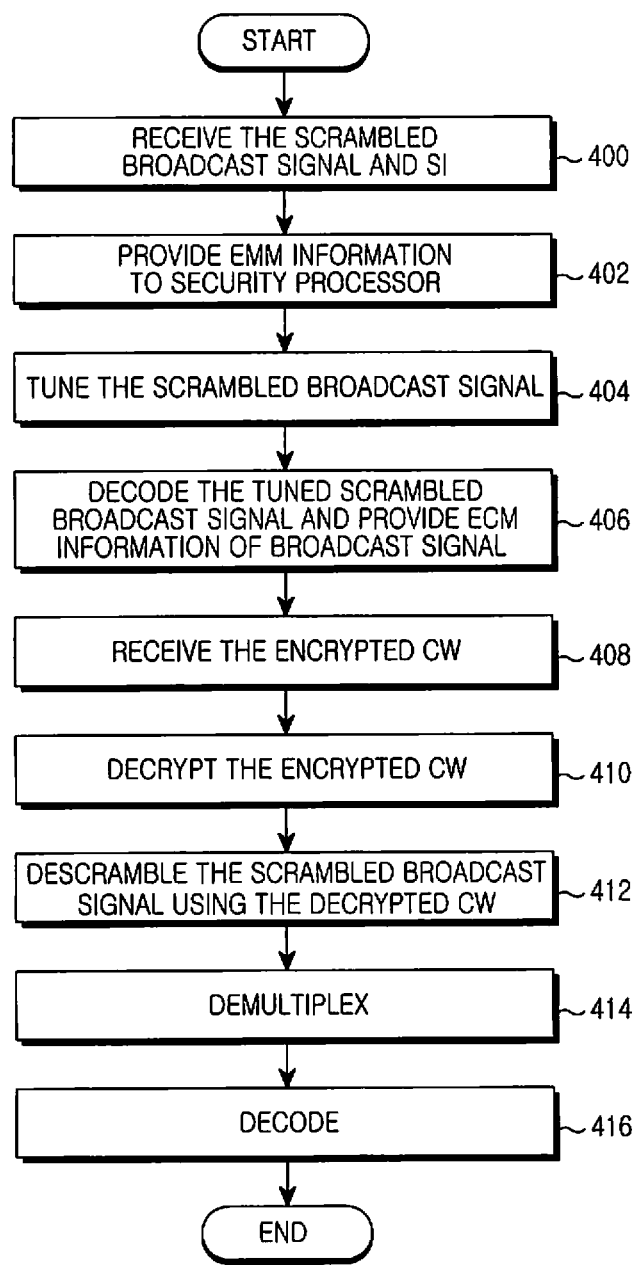
FIG. 4 illustrates operations of the set-top box for the CAS function without a cablecard according to an embodiment of the present invention.

FIG. 4 is a flowchart of operations of the set-top box 210 for the CAS function without a cablecard according to an embodiment of the present invention.

In step 400, the set-top box receives a scrambled broadcast signal and OOB data (the SI and the EMM) from the headend 200. Herein, the headend 200 scrambles the broadcast signal using the CW and the ECM information.

In step 402, the set-top box provides the received EMM information to the security processor 230. In step 404, the set-top box tunes the scrambled broadcast signal from the headend 200. Steps 402 404 may be processed, in parallel, independent from each other.

In step 406, the set-top box demodulates the tuned broadcast signal into a digital bit stream. The bit stream includes the video, audio, or data stream and also includes the ECM information. The demodulated ECM information is fed to the security processor 230.

In step 408, the set-top box receives the CW, which is encrypted based on the PKI, from the security processor 230. The step 408 is performed without regard to the order of the steps 400 through 406.

The set-top box decrypts the encrypted CW in step 410, descrambles the scrambled broadcast signal using the decrypted CW in step 412, demultiplexes the descrambled audio, video, and data signals in step 414, and decodes the demultiplexed video, audio, and data streams that can be interpreted by the TV set in step 416.

Upon completing step 416, the method according to FIG. 4 is finished.

Figure 5:
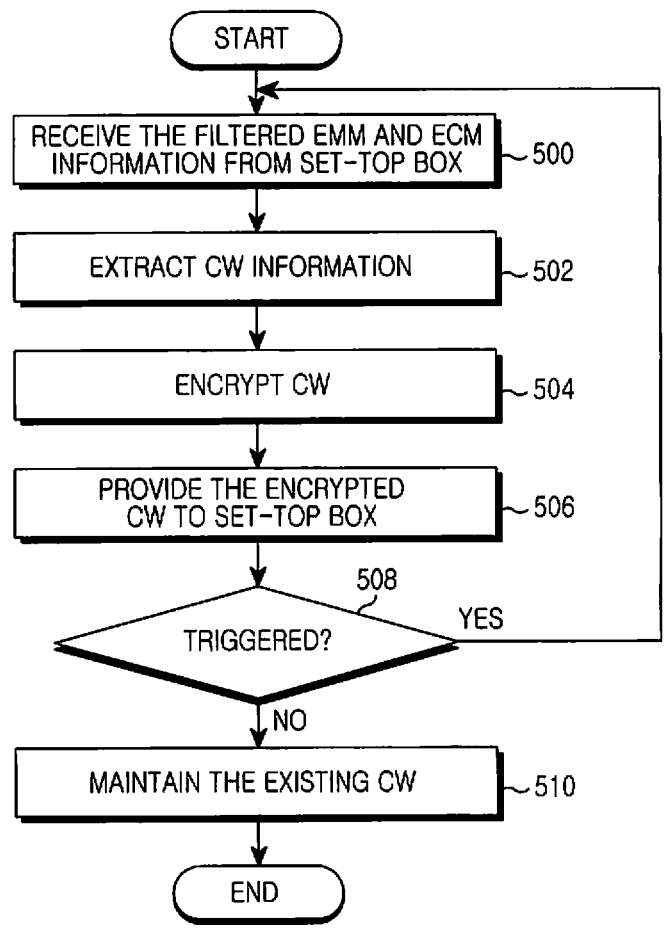
FIG. 5 illustrates operations of the security processor for the CAS function without a cablecard according to an embodiment of the present invention.

FIG. 5 is a flowchart of operations of the security processor 230 for performing CAS functions without a cablecard according to an embodiment of the present invention.

Referring to FIG. 5, the security processor 230 receives the filtered EMM and ECM information from the set-top box 210 in step 500, and extracts the CW using the EMM and the ECM information in step 502.

The security processor encrypts the CW in step 504 and provides the encrypted CW to the set-top box 210 in step 506.

When the CW information is triggered in step 508, the security processor proceeds to step 500 and updates the CW by receiving the corresponding ECM information. By contrast, when the CW information is not triggered in step 508, the security processor maintains the existing CW in step 510, which completes the process of FIG. 5.

As set forth above, the set-top box and the security processor according to an embodiment of the present invention perform CAS functions without use of a cablecard in the CAS, thus addressing the problems in the use of the cablecard such as heat generation, cost, and waste of resources. Also, the channel change speed and performance of set-top boxes can be enhanced. Further, when applying the present invention, since the headend or the existing digital cable broadcast network can be still used, cable providers will not have to install new equipment or change existing equipment.

Although the present invention has been shown and described with reference to certain embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

What is claimed is:

1. An apparatus of a set-top box for performing a Conditional Access System (CAS) function, comprising:
    a tuner for tuning to a scrambled broadcast signal from a headend;
    a demodulator for demodulating the tuned broadcast signal;
    a security processor for extracting a Control Word (CW) from the tuned broadcast signal and encrypting the extracted CW using a Copy Protection (CP) key and forwarding the encrypted CW to a descrambler of the set-top box; and the descrambler for decrypting the encrypted CW and descrambling the demodulated broadcast signal, which is received from the demodulator, using the decrypted CW, without using a cablecard, wherein the security processor and set-top box respectively include resources, and the security processor performs the extracting, encrypting and forwarding steps utilizing the resources of the set-top box when the resources of the security processor are below a predetermined amount.

2. The apparatus of claim 1, wherein the demodulator sends an Entitlement Control Message (ECM) to the security processor.

3. The apparatus of claim 2, wherein the demodulator filters and sends Entitlement Management Message (EMM) information to the security processor according to ECM filtering information requested by the security processor.

4. The apparatus of claim 1, further comprising:
a cable modem for receiving an Entitlement Management Message (EMM) and Service Information (SI) from the headend, forwarding EMM information to the security processor, and forwarding the SI information to a navigator.

5. The apparatus of claim 4, wherein the cable modem filters and provides the EMM information to the security processor according to EMM filtering requested by the security processor.

6. The apparatus of claim 1, wherein the descrambler receives the encrypted CW from the security processor, decrypts the encrypted CW, and descrambles the broadcast signal using the decrypted CW.

7. The apparatus of claim 1, wherein, the encrypted CW periodically changes, and
wherein when a periodic change of the encrypted CW is triggered, the descrambler receives a new encrypted CW from the security processor.

8. An apparatus of a security processor for performing a Conditional Access System (CAS) function, the apparatus comprising:
the security processor for receiving Entitlement Control Message (ECM) information and Entitlement Management Message (EMM) information from a set-top box, extracting a Control Word (CW) using the ECM information and the EMM information, encrypting the CW, and transmitting the encrypted CW to a descrambler of the set-top box, without using a cablecard,
wherein the encrypted CW is decrypted and is used for descrambling a broadcast signal in the set-top box, and
wherein the security processor and set-top box respectively include resources, and the security processor performs the receiving, extracting, encrypting and transmitting steps utilizing the resources of the set-top box when the resources of the security processor are below a predetermined amount.

9. The apparatus of claim 8, wherein the CW is encrypted with a Copy Protection (CP) key.

10. The apparatus of claim 8, wherein a Message Authentication Code (MAC) using a hash function is used together with the CW encryption.

11. The apparatus of claim 10, wherein the hash function is a Secure Hash Algorithm-1 (SHA-1) algorithm.

12. An operation method of a set-top box for performing a Conditional Access System (CAS) function without using a cablecard, comprising:

tuning, by a tuner, to a scrambled broadcast signal from a headend;

demodulating, by a demodulator, the tuned broadcast signal;

extracting, by a security processor, a Control Word (CW) from the tuned broadcast signal and encrypting the extracted CW using a Copy Protection (CP) key;

forwarding, by the security processor, the encrypted CW to a descrambler of the set-top box; and decrypting, by the descrambler, the encrypted CW and descrambling the demodulated broadcast signal, which is received from the demodulator, using the decrypted CW, without the cablecard, wherein the security processor and set-top box respectively include resources, and the security processor performs the extracting and forwarding steps utilizing the resources of the set-top box when the resources of the security processor are below a predetermined amount.

13. The operation method of claim 12, further comprising:
sending an Entitlement Control Message (ECM) to the security processor to extract the CW.

14. The operation method of claim 13, wherein Entitlement Management Message (EMM) information is filtered and transmitted to the security processor according to ECM filtering information requested by the security processor.

15. The operation method of claim 12, further comprising:
receiving an Entitlement Management Message (EMM) and Service Information (SI) from the headend, forwarding EMM information to the security processor, and forwarding the SI information to a navigator.

16. The operation method of claim 15, wherein the EMM information is filtered and transmitted to the security processor according to EMM filtering requested by the security processor.

17. The operation method of claim 12, wherein the encrypted CW is received from the security processor, the encrypted CW is decrypted, and the broadcast signal is descrambled using the decrypted CW.

18. The operation method of claim 12, wherein the encrypted CW periodically changes, and
wherein when a periodic change of the encrypted CW is triggered, a new encrypted CW is received from the security processor and updated.

19. An operation method of a security processor for performing a Conditional Access System (CAS) function, comprising:
receiving Entitlement Control Message (ECM) information and Entitlement Management Message (EMM) information from a set-top box; and
extracting a Control Word (CW) using the ECM information and the EMM information, encrypting the CW, and transmitting the encrypted CW to a descrambler of the set-top box, without using a cablecard,
wherein the encrypted CW is decrypted and is used for descrambling a broadcast signal in the set-top box, and
wherein the security processor and set-top box respectively include resources, and the security processor performs the receiving and extracting steps utilizing the resources of the set-top box when the resources of the security processor are below a predetermined amount.

20. The operation method of claim 19, wherein the CW is encrypted with a Copy Protection (CP) key.

21. The operation method of claim 19, wherein a Message Authentication Code (MAC) using a hash function is used together with the CW encryption.

22. The operation method of claim 21, wherein the hash function is a Secure Hash Algorithm-1 (SHA-1) algorithm.

23. An apparatus of a set-top box for performing a Conditional Access System (CAS) function, comprising:
   a security processor for extracting a Control Word (CW) from a broadcast signal, encrypting the extracted CW using a Copy Protection (CP) key, and providing the encrypted CW to a descrambler of the set-top box based on Public Key Infrastructure (PKI); and
   the descrambler for decrypting the encrypted CW and descrambling a scrambled broadcast signal using the decrypted CW, without using a cablecard,
   wherein the security processor and set-top box respectively include resources, and the security processor performs the extracting, encrypting and providing steps utilizing the resources of the set-top box when the resources of the security processor are below a predetermined amount.

24. The apparatus of claim 23, further comprising:
   a demodulator for sending Entitlement Management Message (EMM) information to the security processor according to Entitlement Control Message (ECM) filtering information requested by the security processor.

25. The apparatus of claim 23, further comprising:
   a cable modem for receiving an Entitlement Management Message (EMM) and Service Information (SI) from the headend, forwarding EMM information to the security processor, and forwarding the SI information to a navigator.

26. The apparatus of claim 25, wherein the cable modem filters and provides the EMM information to the security processor according to EMM filtering requested by the security processor.

* * * * *